United States Patent
May

(10) Patent No.: US 7,588,228 B2
(45) Date of Patent: Sep. 15, 2009

(54) ADJUSTABLE TRIPOD STAND

(76) Inventor: Randall L. May, 2 Trafalgar, Newport Beach, CA (US) 92660

( * ) Notice: Subject to any disclaimer, the term of this patent is extended or adjusted under 35 U.S.C. 154(b) by 222 days.

(21) Appl. No.: 10/345,891

(22) Filed: Jan. 16, 2003

(65) Prior Publication Data

US 2005/0274854 A1    Dec. 15, 2005

(51) Int. Cl.
*F16M 11/38* (2006.01)
(52) U.S. Cl. .................. 248/436; 248/435; 248/284.1; 248/346.3; 248/165; 248/166; 84/421
(58) Field of Classification Search ................ 248/166, 248/167, 172, 173, 176.1, 434, 440, 440.1, 248/436, 435, 424, 425, 421, 165, 161, 127, 248/131, 144, 220.21, 284.1, 309.1, 346.3, 248/327, 329; 84/327, 329, 421
See application file for complete search history.

(56) References Cited

U.S. PATENT DOCUMENTS

| | | | | |
|---|---|---|---|---|
| 1,227,850 A | * | 5/1917 | Stone | 248/673 |
| 3,405,587 A | * | 10/1968 | Meazzi et al. | 84/421 |
| 3,462,110 A | * | 8/1969 | Cheslock | 248/219.4 |
| 4,934,638 A | * | 6/1990 | Davis | 248/164 |
| 5,072,910 A | * | 12/1991 | May | 248/412 |

(Continued)

OTHER PUBLICATIONS

Drum Central Website, www.drumcentral.com/handpercussionpics197.htm, Published: Oct. 9, 2002.*

(Continued)

Primary Examiner—J. Allen Shriver
Assistant Examiner—Todd M. Epps
(74) Attorney, Agent, or Firm—Kirk A. Buhler; Buhler & Associates

(57) ABSTRACT

An adjustable tripod stand having independently adjustable legs includes an upright member for supporting an object, such as a drum, at its upper end. A pair of independently movable collar members are slidably mounted on the upright member and longitudinally adjustable relative to and past one another and to an upright portion for selective positioning thereon. A releasable fastener on the collars secures them to the upright member at selected positions. Three movable leg members are connected at their upper ends, two to one of the collar members and one to the other collar member. Movement of the collar members permits the stand to be erected in limited or confined areas. The stand preferably includes a leg extender member slidably mounted on the exterior one of the leg members, which is movable a selected distance permitting the stand to be positioned on different levels, such as stairs. An embodiment for supporting bass drums has a collar member fitting the upright member having four equally spaced radially extending lugs. Four legs are pivotally supported on the lugs and movable toward and away the upright member to provide a cradle for receiving and supporting a bass drum. Another embodiment for supporting a conga drum has three independently movable legs, two sets of collar members slidably mounted on the legs, a central pivot member for each set of collar members, and upper and lower leg extender members slidably positioned on the legs. Support plates on the upper ends of the upper leg extender members are movable therewith to an upper position defining a base for supporting a conga drum. When one of the lower leg extender members is extended a support is provided for the tripod on different levels.

20 Claims, 16 Drawing Sheets

U.S. PATENT DOCUMENTS 5,335,575 A * 8/1994 Hoshino ...................... 84/421
6,410,833 B1 * 6/2002 Brando ..................... 84/411 R
6,416,029 B1 * 7/2002 Holtermanns .......... 248/346.06
6,541,685 B2 * 4/2003 Meinl ......................... 84/421
2004/0051021 A1 * 3/2004 Michael

OTHER PUBLICATIONS

Drums in Space Website, www.drumsinspace.com/store/index.php?cat=4&sub=13, Published: Dec. 9, 2002.*

* cited by examiner

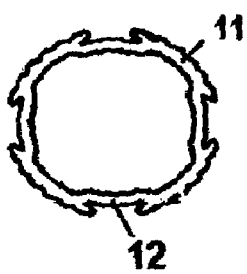
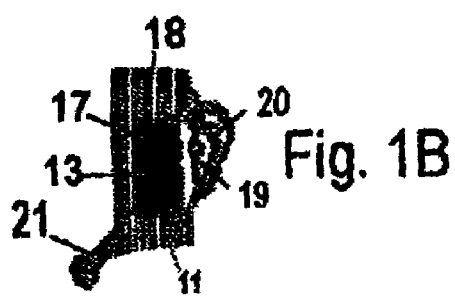
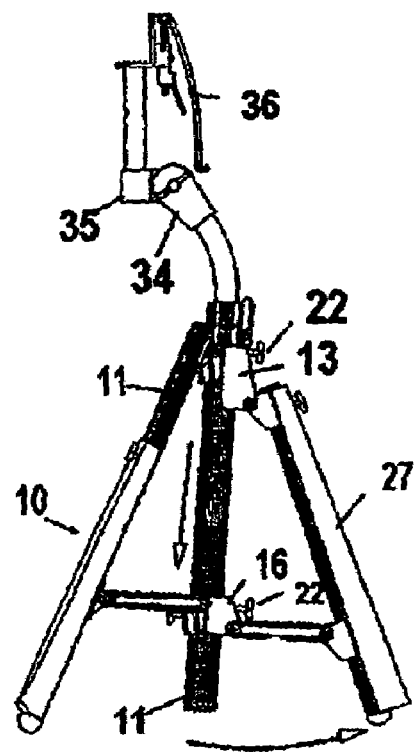
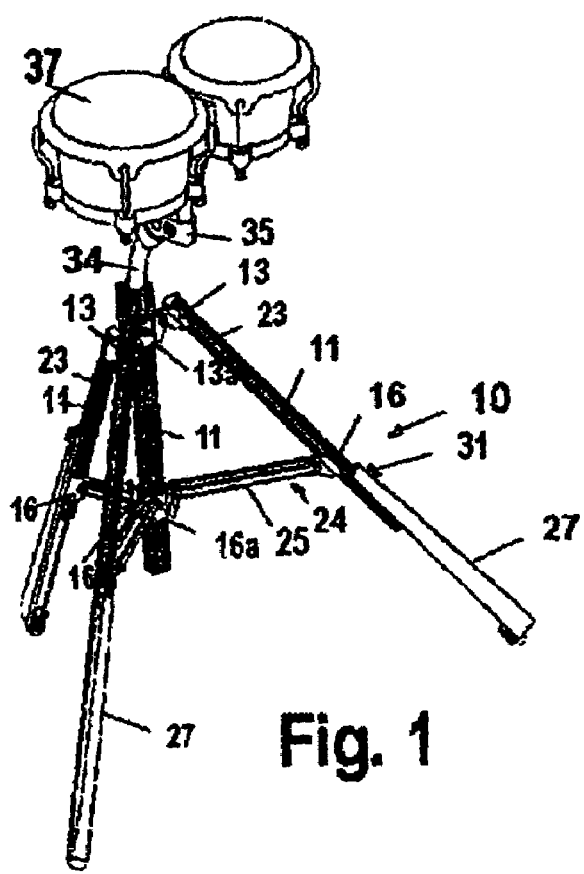
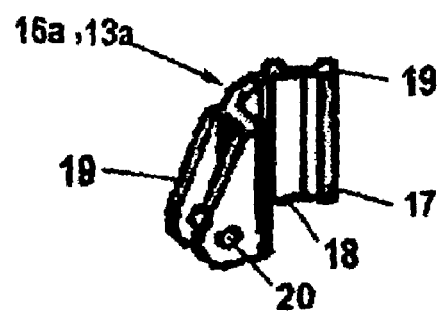
Fig. 1A
Fig. 1B
Fig. 2
Fig. 1
Fig. 2A

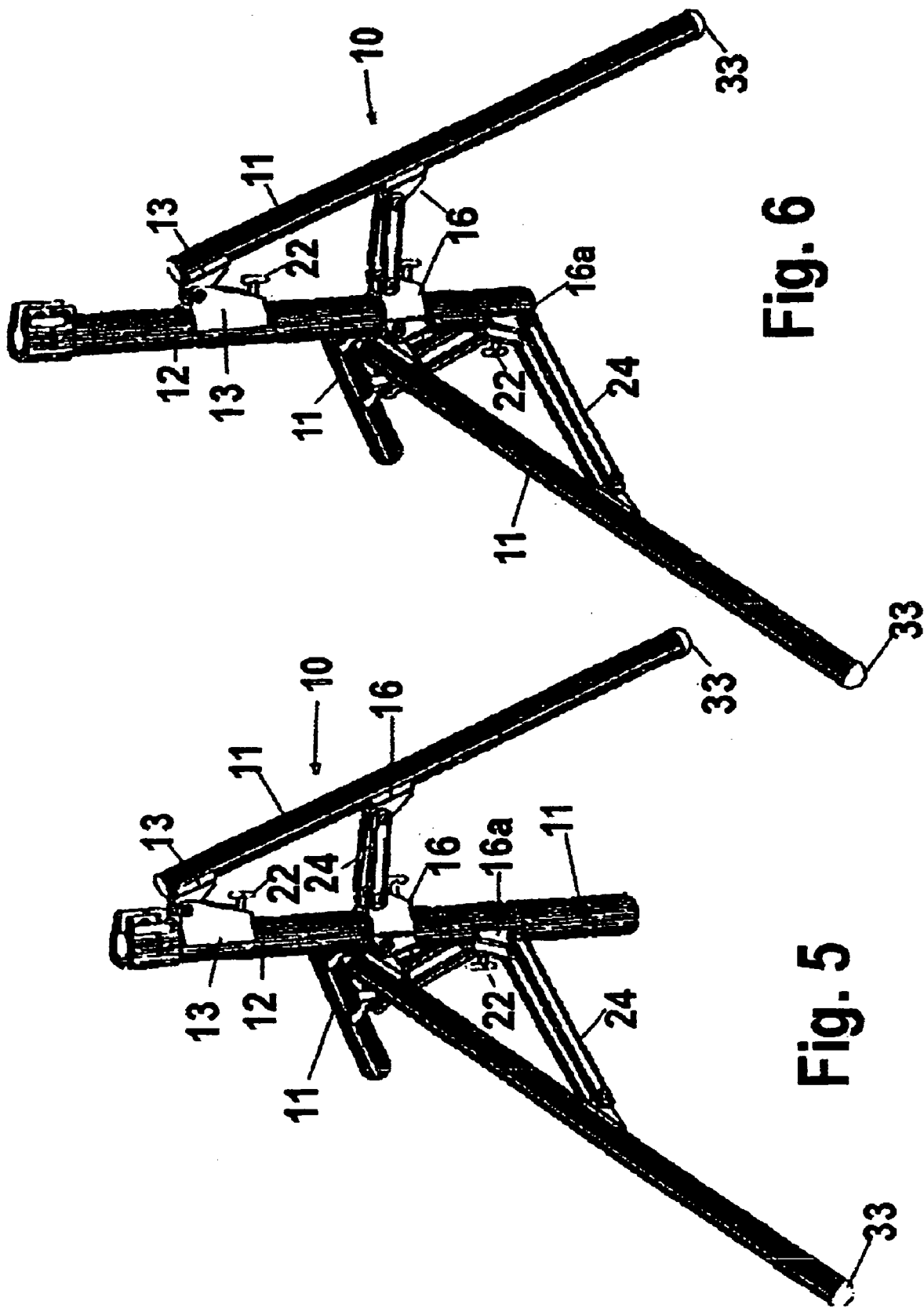

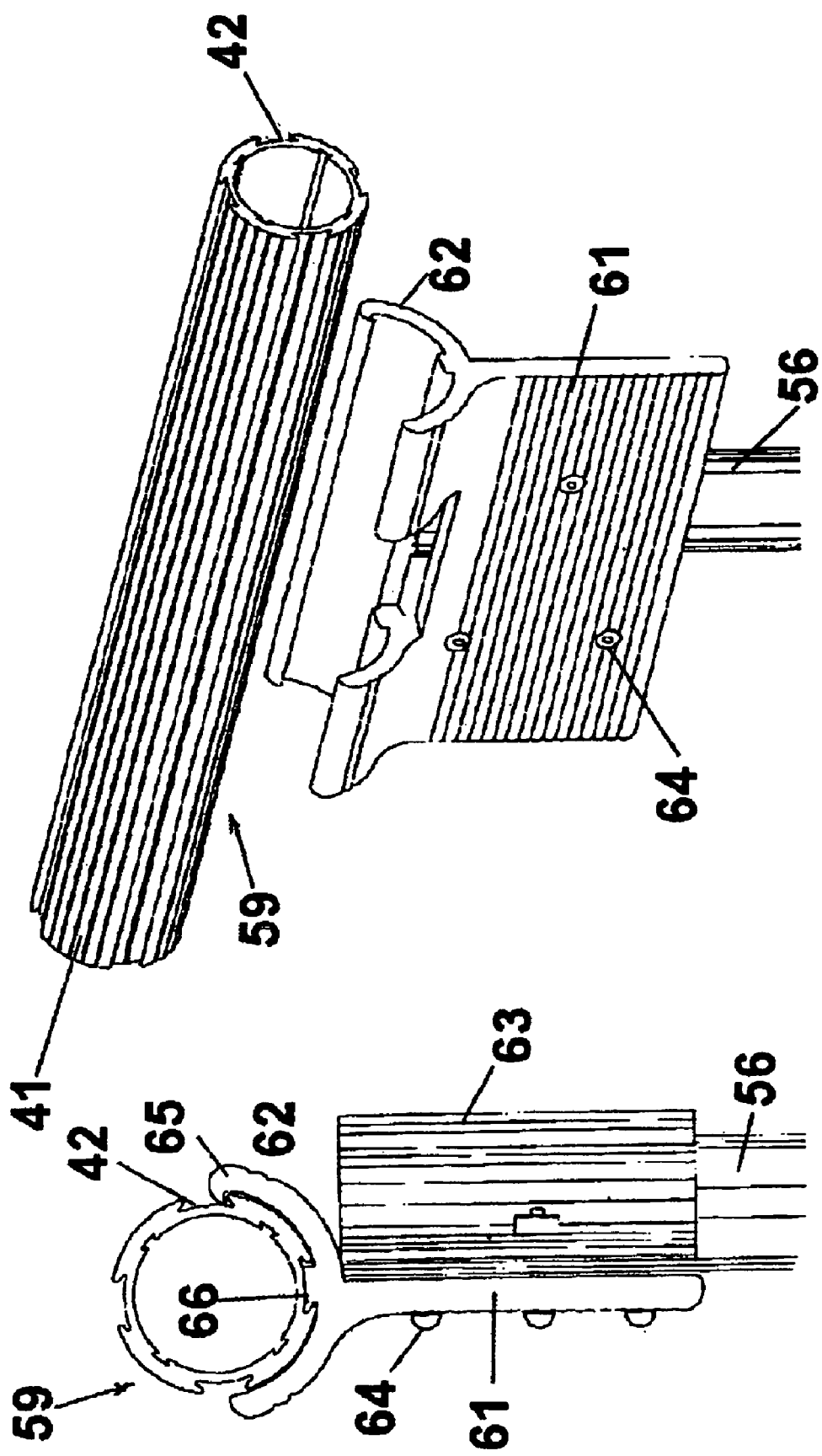

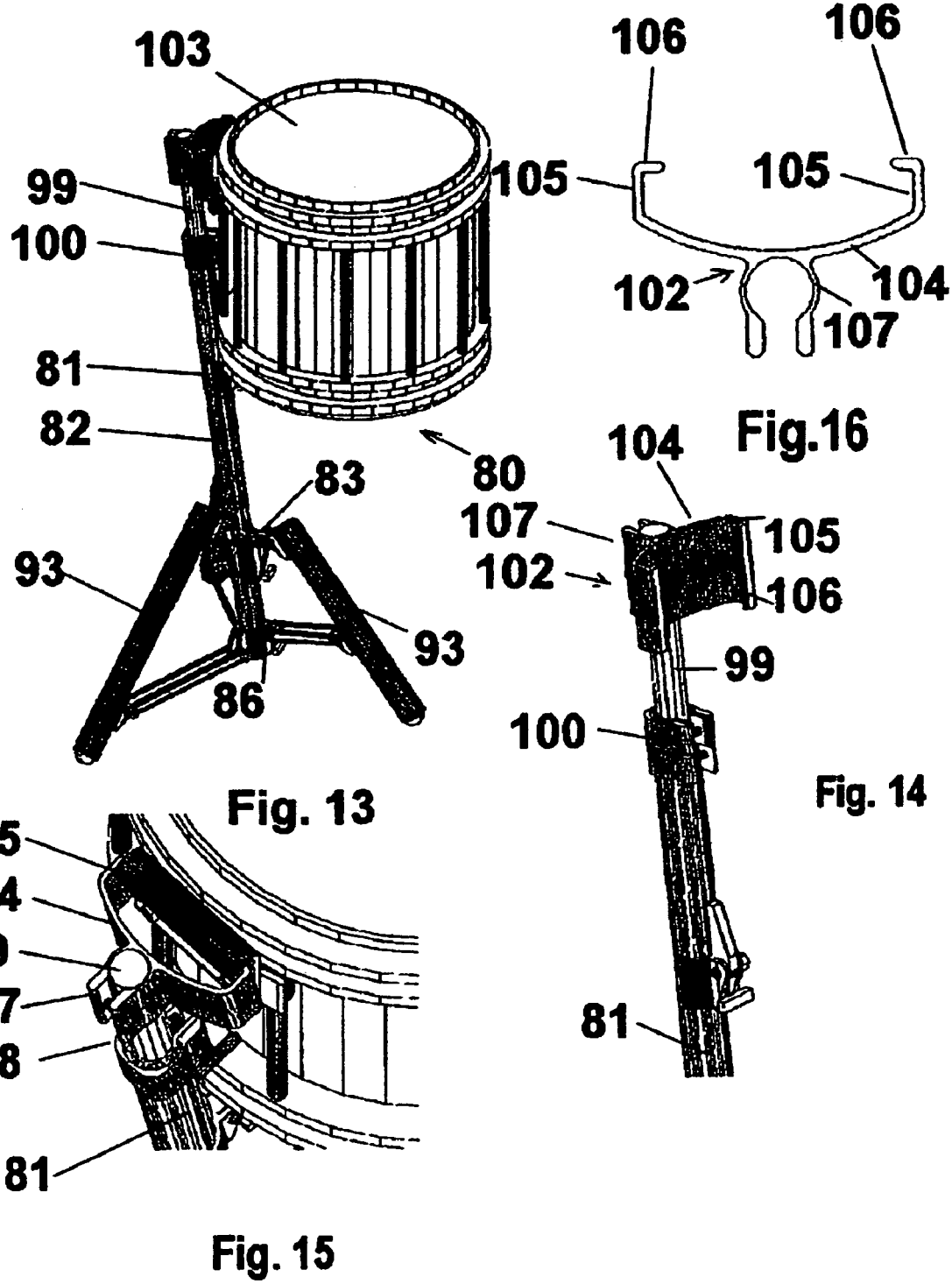

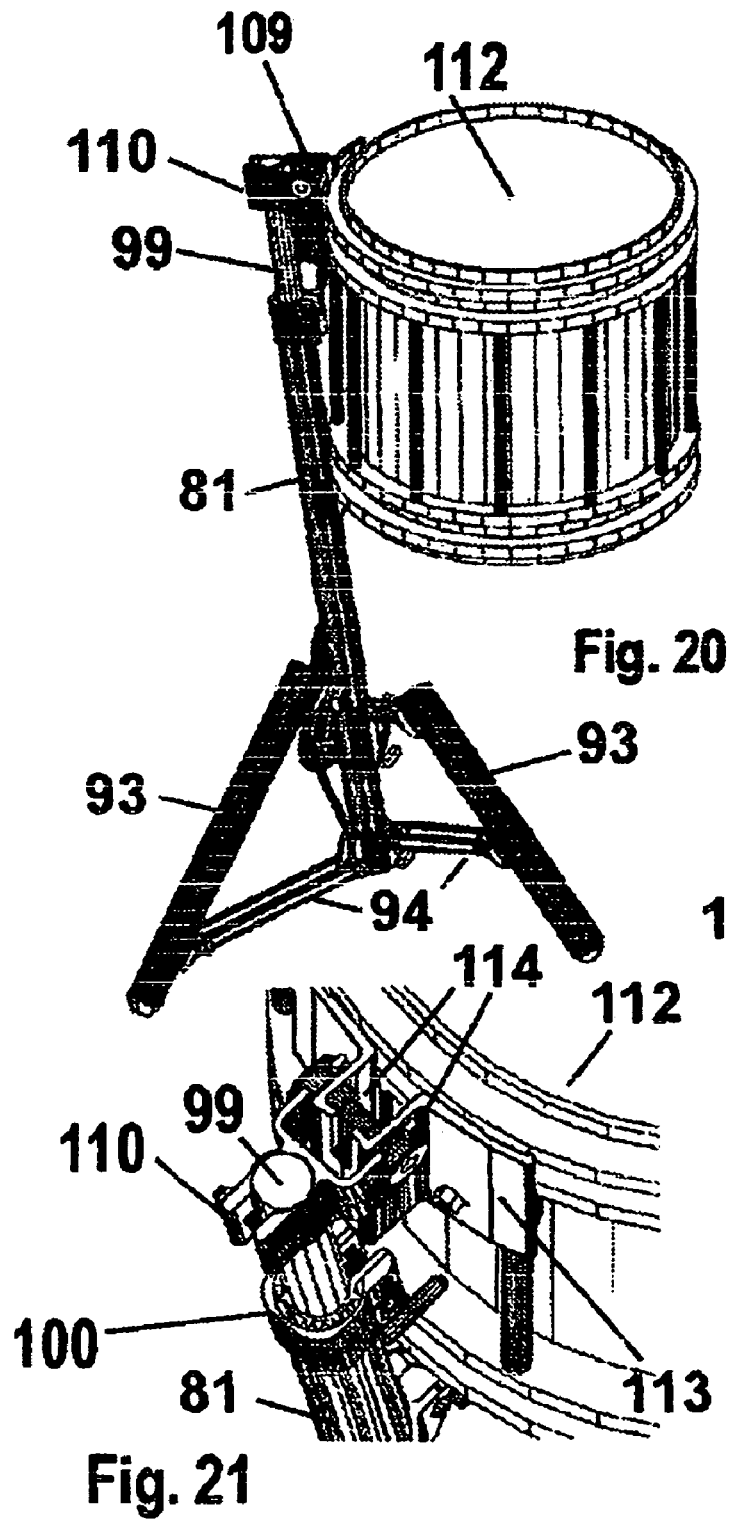

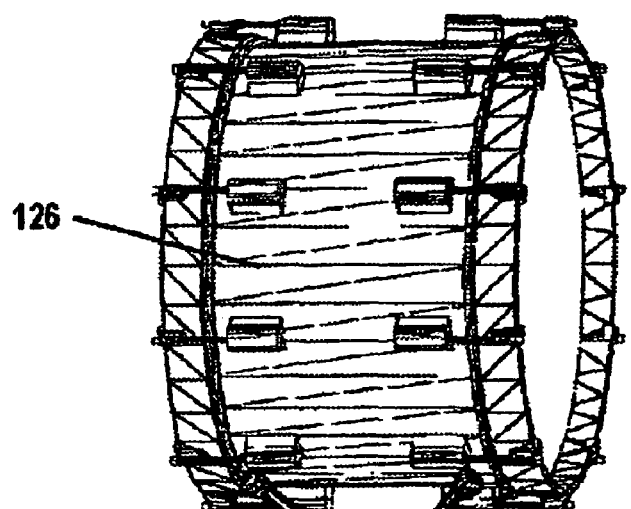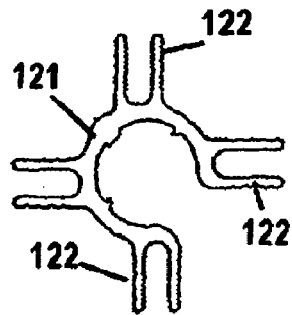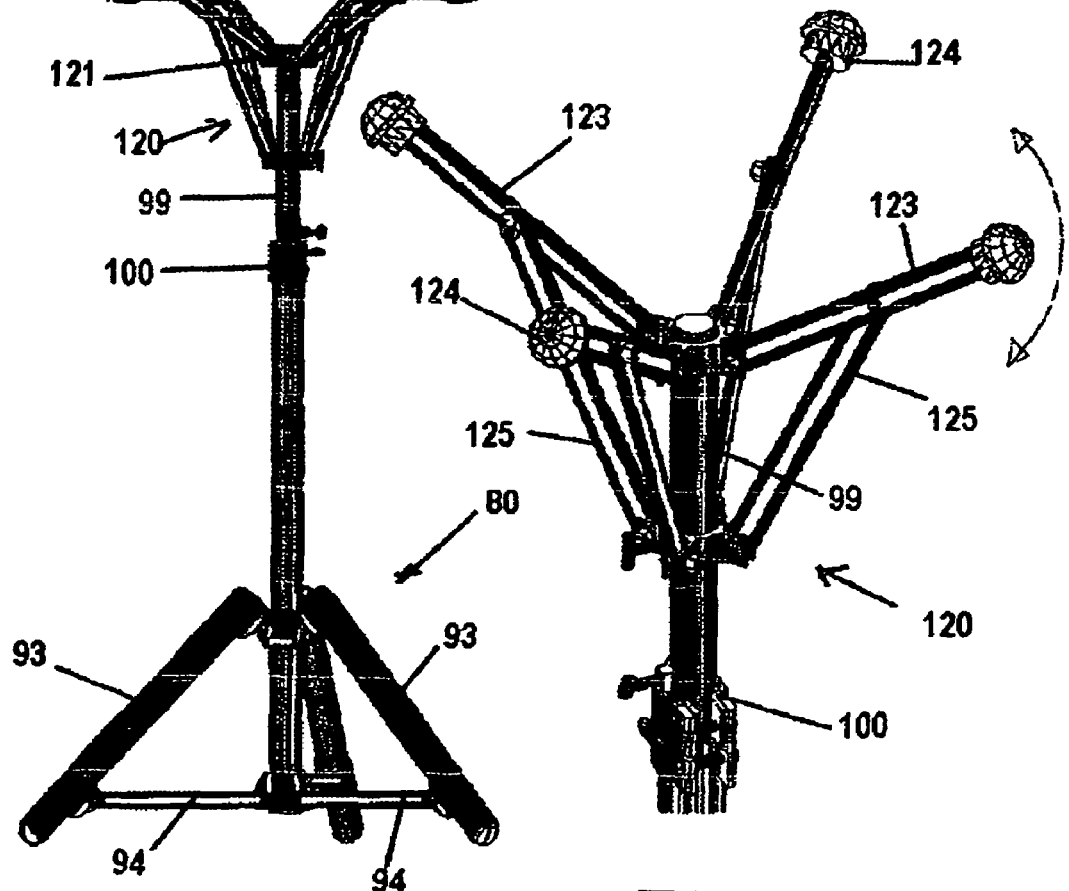
Fig. 25A
Fig. 25
Fig. 26

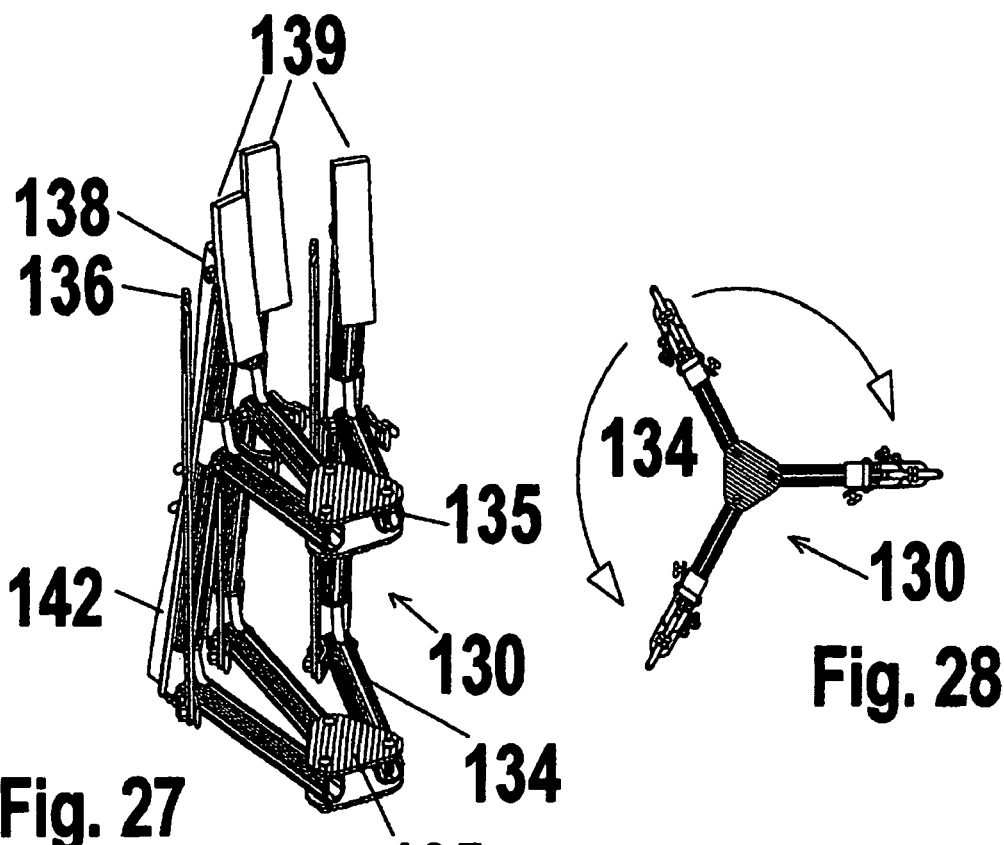
Fig. 27
Fig. 28
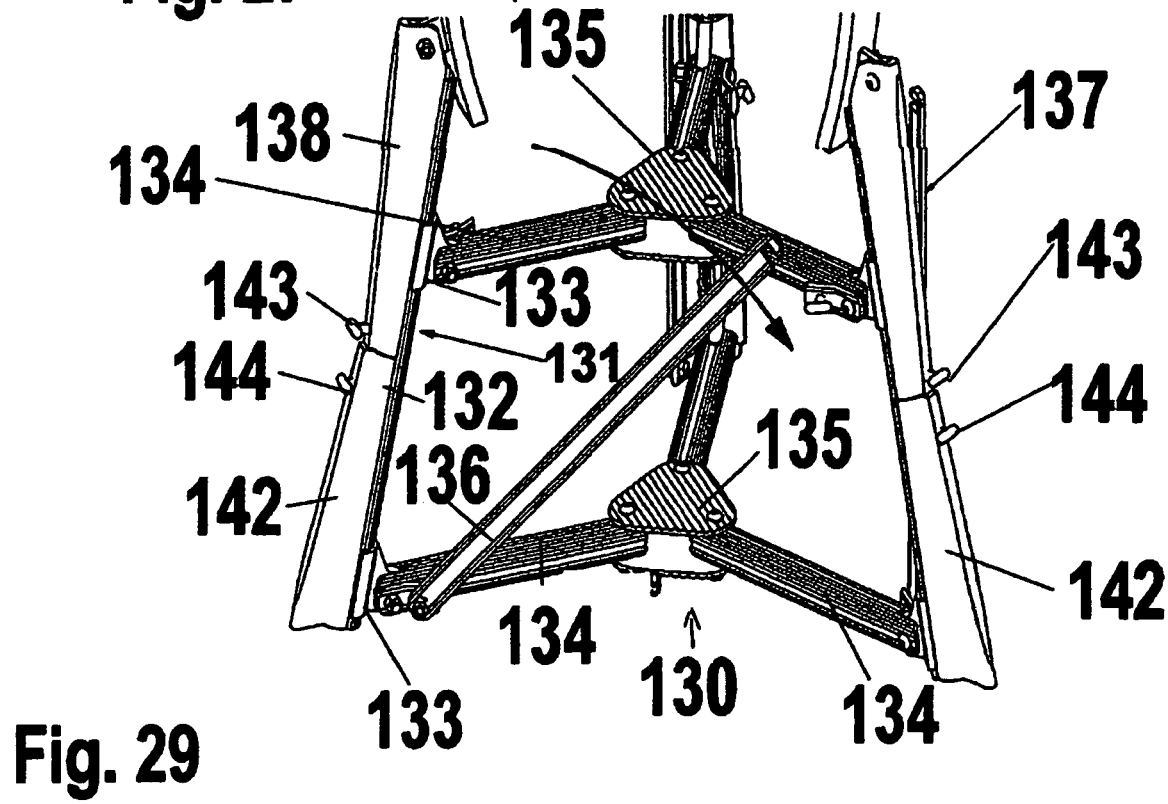
Fig. 29

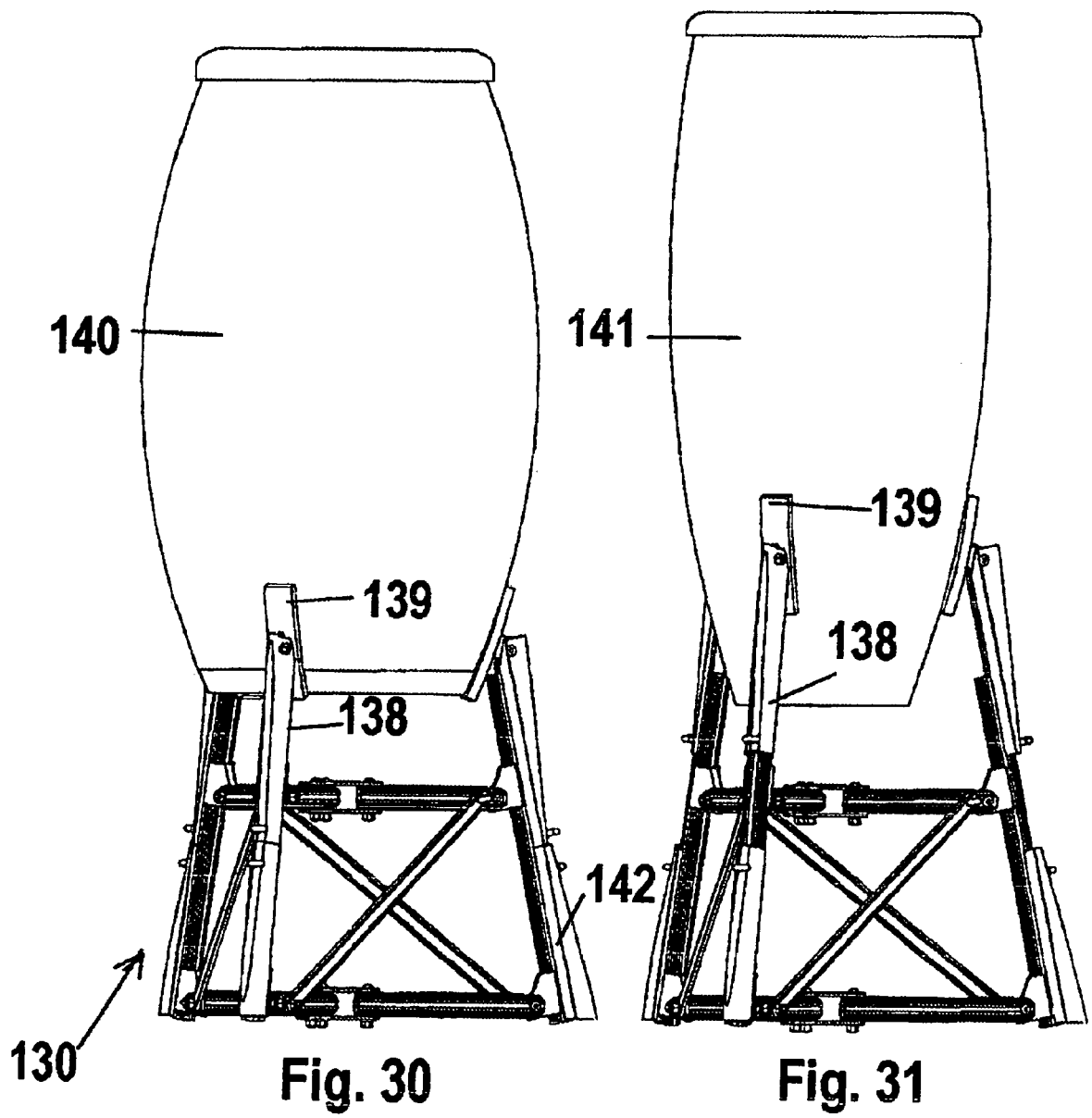

ADJUSTABLE TRIPOD STAND

BACKGROUND OF THE INVENTION

1. Field of the Invention

This invention relates generally to tripod stands, and more particularly to an adjustable tripod stand for supporting various articles that has independently adjustable movable legs for installation on the steps of a stadium or auditorium.

2. Brief Description of the Prior Art

Tripod stands are desirable for supporting various articles and instruments since they provide selective height adjustment and a stable support. They are particularly useful is supporting such things as cameras, video equipment, telescopes, surveying instruments, and musical instruments. Tripod stands for drums, however, raise special problems when used on steps or stairs of an auditorium or stadium.

There are several patents that describe various adjustable tripod stand devices.

Bruneau U.S. Pat. No. 1,517,825 shows a tripod support for a table having adjustable legs.

Ley U.S. Pat. No. 1,894,695 shows another tripod support for a table having adjustable legs.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a tripod type support for supporting the instrument in a reference position.

This invention is an improvement over May U.S. Pat. No. 5,072,910. It is distinguished over the prior art in general, and these patents in particular by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the tripod is adjustable in length a sufficient amount to permit support on two different stairs or steps of an auditorium or stadium.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The one adjustable leg of the tripod allows the stand to be erected on multi-level surfaces.

SUMMARY OF THE INVENTION

It Is therefore an object of the present invention to provide an adjustable tripod stand that has independently adjustable movable legs.

It is another object of this invention to provide an adjustable tripod stand that allows for multiple angularities and tripod configurations.

Another object of this invention is to provide an adjustable tripod stand that has independently adjustable movable legs providing versatility and stability in the support system.

Another object of this invention is to provide an adjustable tripod stand that allows for the body of the stand may be oriented in an off-axis position while maintaining the center of gravity in a stable support system.

A further object of the present invention to provide an adjustable tripod stand that has independently adjustable movable legs for supporting drums, including timbale, tenor, snare, and bass drums.

A still further object of this invention is to provide an adjustable tripod stand for supporting articles which is simple in construction, light-weight, economical to manufacture, and rugged and reliable in use.

Other objects of the invention will become apparent from time to time throughout the specification and claims as hereinafter related.

BRIEF DESCRIPTION OF THE DRAWINGS

FIG. 1 is an isometric view of a preferred, adjustable-tripod-stand for bongo drums in accordance with one embodiment of the present invention.

FIG. 1A is an end view of one of the center tubes or legs of the tripod.

FIG. 1B is an isometric view of one of the leg clamps positioned on the center tube of the tripod.

FIG. 2 is a view in side elevation of the adjustable tripod stand shown in FIG. 1.

FIG. 2A is an isometric view of one of the leg clamps for the tripod shown in FIGS. 1 and 2.

FIGS. 5 and 6 are isometric views of the stand of FIG. 1, illustrating vertical adjustment of the center post.

FIG. 9 is an exploded, isometric of the carrier tube of the tripod stand shown in FIG. 10.

FIG. 10 is an end view of the carrier tube of the tripod stand of FIG. 9.

FIG. 13 is an isometric view of an adjustable tripod stand for snare drums in accordance with the present invention.

FIG. 14 is a detail view of the center supporting post for the adjustable tripod stand shown in FIG. 13.

FIG. 15 is a detail view of the connection of the center supporting post to a snare drum in the stand of FIG. 13.

FIG. 16 is an end view of drum supporting bracket shown in FIG. 14.

FIGS. 20-22 are isometric views similar to FIGS. 13-15 showing an alternate connection of the center post to the snare drums.

FIG. 25 is an isometric view of a tripod stand and bass drum.

FIG. 25A is an end view of supporting collar for the drum-supporting legs in FIGS. 25 and 26.

FIG. 26 is an isometric view of the legs or the cradle for supporting a bass drum as shown in FIG. 23.

FIG. 27 is an isometric view of a tripod cradle for large drums such as congas in folded position.

FIG. 28 is a plan view of the tripod cradle of FIG. 27 in an opened position.

FIG. 29 is an isometric view of the opened tripod cradle of FIGS. 27 and 28.

FIGS. 30 and 31 are views in elevation of the tripod cradle of FIGS. 27-29 in opened position with different size conga drums supported in place.

FIG. 31 is a view in elevation of the tripod cradle of FIGS. 27-29 in opened position with a conga drum supported in place and the cradle legs extended to raise the drum.

DESCRIPTION OF A PREFERRED EMBODIMENT

Figure 4:
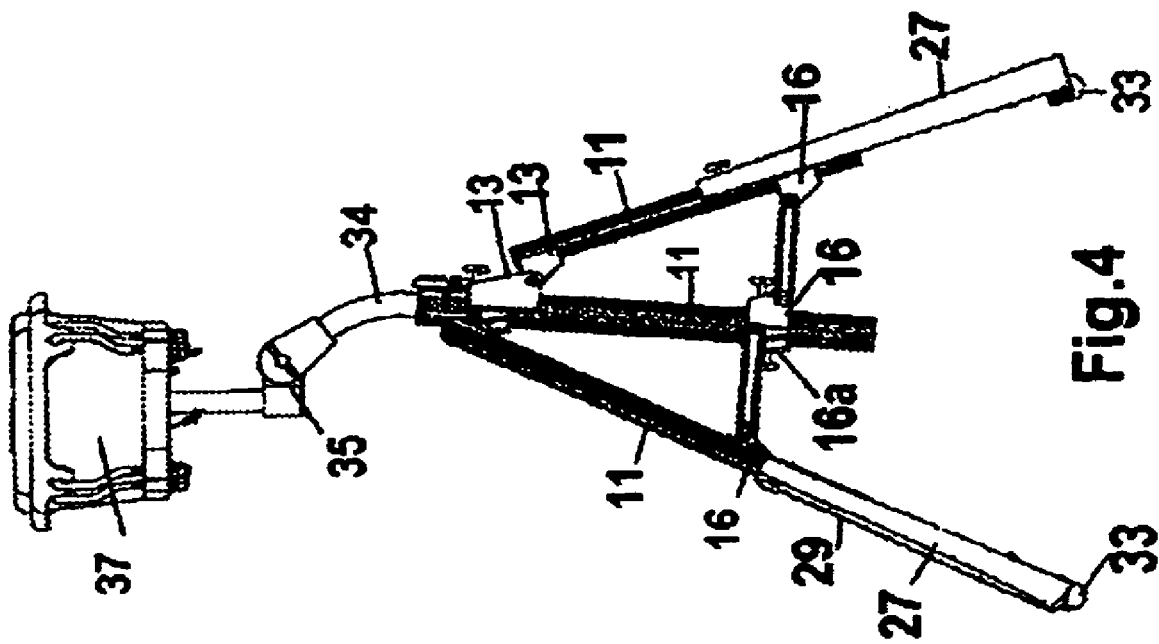
FIG. 4 is a view in side elevation of the stand of FIG. 1, illustrating vertical adjustment of the tripod legs.
Figure 3:
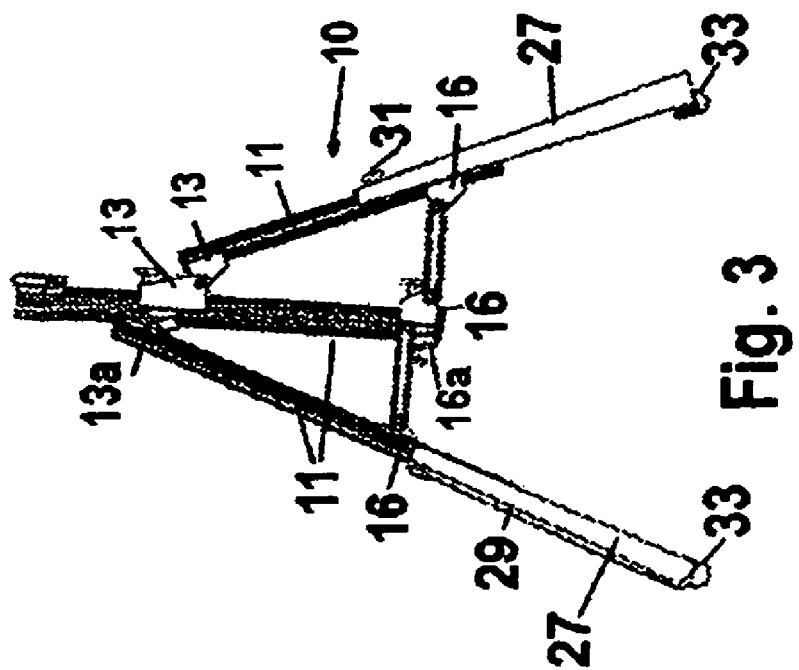
FIG. 3 is a view in side elevation of the stand of FIG. 1, illustrating vertical adjustment of the center post
Figure 7:
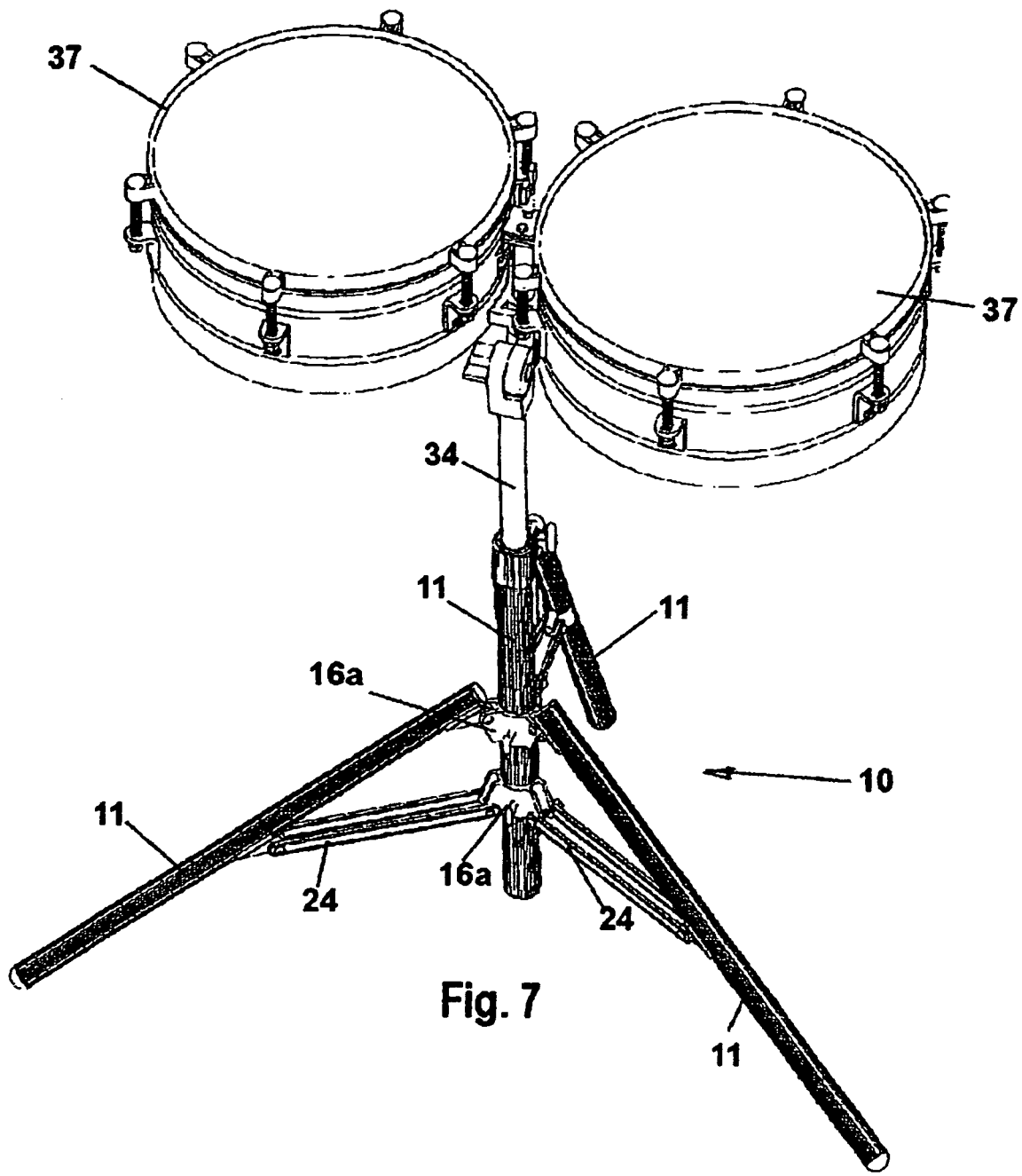
FIG. 7 is an isometric view of a preferred, adjustable-tripod-stand for timbale drums with drums installed in accordance with one embodiment of the present invention

Referring to the drawings by numerals of reference, there is shown in FIGS. 1-7, a preferred adjustable tripod stand 10 having a longitudinal upright center tube 11, which is fluted with a plurality of circumferentially spaced grooves 12 extending longitudinally of its exterior surface. There are four grooves 12 (FIG. 1A), which are equally spaced and dovetail shaped in cross section. Fluted tubes 11 are used for the upright support of the tripod and for the legs 23.

A semicircular (half tube) upper leg support collar member 13 (FIGS. 1, 2) for one of the legs 23 and a collar member 13a (FIGS. 1, 2, 2A) for two of the legs 23 are slidably mounted on center tube 11. Semi-circular leg brace support collar members 16 for one of the legs 23 and a collar member 16a for two of the legs 23 are slidably mounted on center tube 11.

Each of the collar members 13,16 (FIG. 1B) is semi-circular in cross section with the longitudinal edges 17 formed inwardly to fit in the dovetail longitudinal grooves 12. Collar member 13 (FIG. 1B) has portion 18 with in-turned portions 17 and ears 19 with holes 20 for receiving a hinge bolt 21.

Each of the collar members 13, 16 is independently movable relative to the others on tubular member 11. Wing screws 22 are provided on the collar members 13, 16 and when tightened, the collar members 13, 16 are locked in a desired position on center tube 11.

The leg brace support collar members 16, 16a are substantially similar in construction and operation to the upper leg support collar members 13, 13a. Each collar member 16 is semi-circular (half tube) in cross section with the longitudinal edges bent inwardly to fit in the longitudinal grooves 12, similar in construction to collar members 13, 16.

Each collar member 16 has wing screws 22 for locking it in place in the same manner as collar members 13. Thus, each collar 16 is independently movable relative to the others on the center tube, and each may be locked in a desired position on the tube 11.

Each of the collar members 13a and 16a (FIG. 2A) has a semi-circular (half tube) portion with longitudinal edges bent inwardly to fit in the longitudinal grooves 12. Collar member 13a and 16a have two sets of ears 19 spaced 120° apart with holes 20 for receiving a hinge bolt 21.

The upper end of each leg member 23 is pivotally mounted on center tube 11. Collar members 13 and 13a on center tube 11 are slidably mounted in grooves 12 and pivotally connected to collar members 13 on leg 23. Two of the leg members 23 are supported on collar member 13a, and one leg member 23 on collar 13 at the top of the center tube 11 to form the tripod. Each leg member 23 has a leg brace 24 comprising a pair of flat bars 25 pivotally connected at one end to collars 16 and 16a on center tube 11. The other ends of bars 25 are connected to collar 16 on leg member 23.

Figure 32:
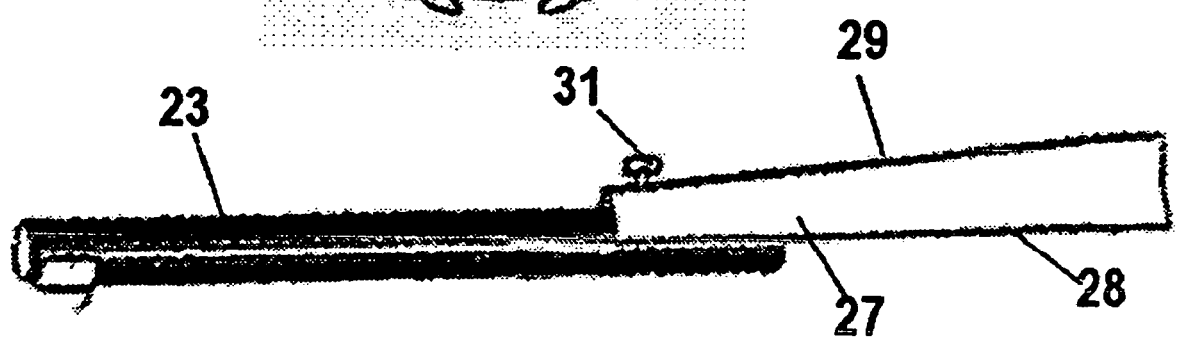
FIG. 32 is a detail view of one of the tripod legs with a leg extender in the extended position.

Each of leg members 23 has a leg extender member 27 slidably supported thereon as shown in FIG. 32. Leg extender member 27 has a semi-circular (half tube) collar portion 28 and a rigid leg portion 29. Collar portion 28 has longitudinal edges 30 formed inwardly to fit in the dovetail longitudinal grooves 12 for sliding movement to extend one of the leg members 23.

A wing screw 31 fits threaded aperture 32 in leg extender member 27 for locking in any selected position. The bottom end of each leg extender member 27 has a footpad 33 formed of resilient material. It should be understood that the bottom end of each leg member 27 may have a wheel or caster (not shown).

An elongate inner tubular member 34 is slidably received within the center tube 11 and anchored in position by a wing screw. The upper end of inner tubular member 34 has a bracket 35 and pivoted locking member 36 for securing drums 37 in place. This tripod is designed for supporting a bongo drum but other drums may be supported if desired.

As seen in FIGS. 3-7, the upper leg collar segments 13, 13a and leg brace collar segments 16,16a are movable from a position where the tripod legs are collapsed to a position where the bottom of the legs will extend radially an equal distance from the center of the tubular member 11.

If one of the upper leg collar segments 13, 13a and its corresponding leg brace collar segment 16, 16a is moved toward the other on the center tube 11, the bottom of the leg(s) connected thereto will be extended radially outward to be positioned an unequal distance from the center of the center tube 11 relative to the other leg(s).

When one of the upper leg collar segments 13, 13a and its corresponding leg brace collar segment 16,16a is moved away from the other on the center tube 11, the bottom of the leg(s) connected thereto will be drawn radially inward to be positioned an unequal distance from the center of the tube 11 relative to the other leg(s).

This allows for placement of the stand in limited or confined areas. If the legs are supported on a level surface, this adjustment will cause the longitudinal, vertical axis of the stand to be disposed in an off-vertical axis position for placing the center of gravity of the supported article relative to the center of the supporting legs. This adjustment also provides a minimum or maximum peripheral support base.

Center tube 11 is adjustable up or down (FIGS. 3 and 4) relative to collar members 13, 13a and 16, 16a. Leg extenders 27 are adjustable to permit the tripod assembly 10 to fit on different levels, when the tripod is used on the stairs or steps of a stadium or auditorium, In addition to the adjustment described above, the upper leg support collars 13, 13a and the leg brace collars 16,16a may be positioned in vertically spaced pairs relative to the other vertically spaced pair. For example, one of the upper leg collar segments 13 or 13a and its corresponding leg brace collar segment 16 or 16a may both be moved upward on the tubular member 11 relative to the other pair and the bottom of the leg(s) connected to the upper pair will be raised relative to the other leg(s).

As described above, the legs may also be extended radially inward and outward. This allows for placement of the stand on an uneven or multi-level surface or platform and also in limited or confined areas. The legs may be adjusted relative to an uneven or multilevel surface to cause the vertical axis of the stand to be disposed in an off-vertical axis position for placing the center of gravity of the supported article relative to the center of the supporting legs even if they are at different heights.

Similarly, the top portion of the stand may have various conventional tripod mounting hardware for mounting a variety of articles and instruments such things as cameras, video equipment, telescopes, surveying instruments, and musical instruments. It should be understood that the particular tripod stand illustrated has a top portion configured to support musical drums, however other top portions may be provided for supporting such things as cameras, video equipment, telescopes, surveying instruments, and the like.

Tripod for Tenor Drums

Figure 8:
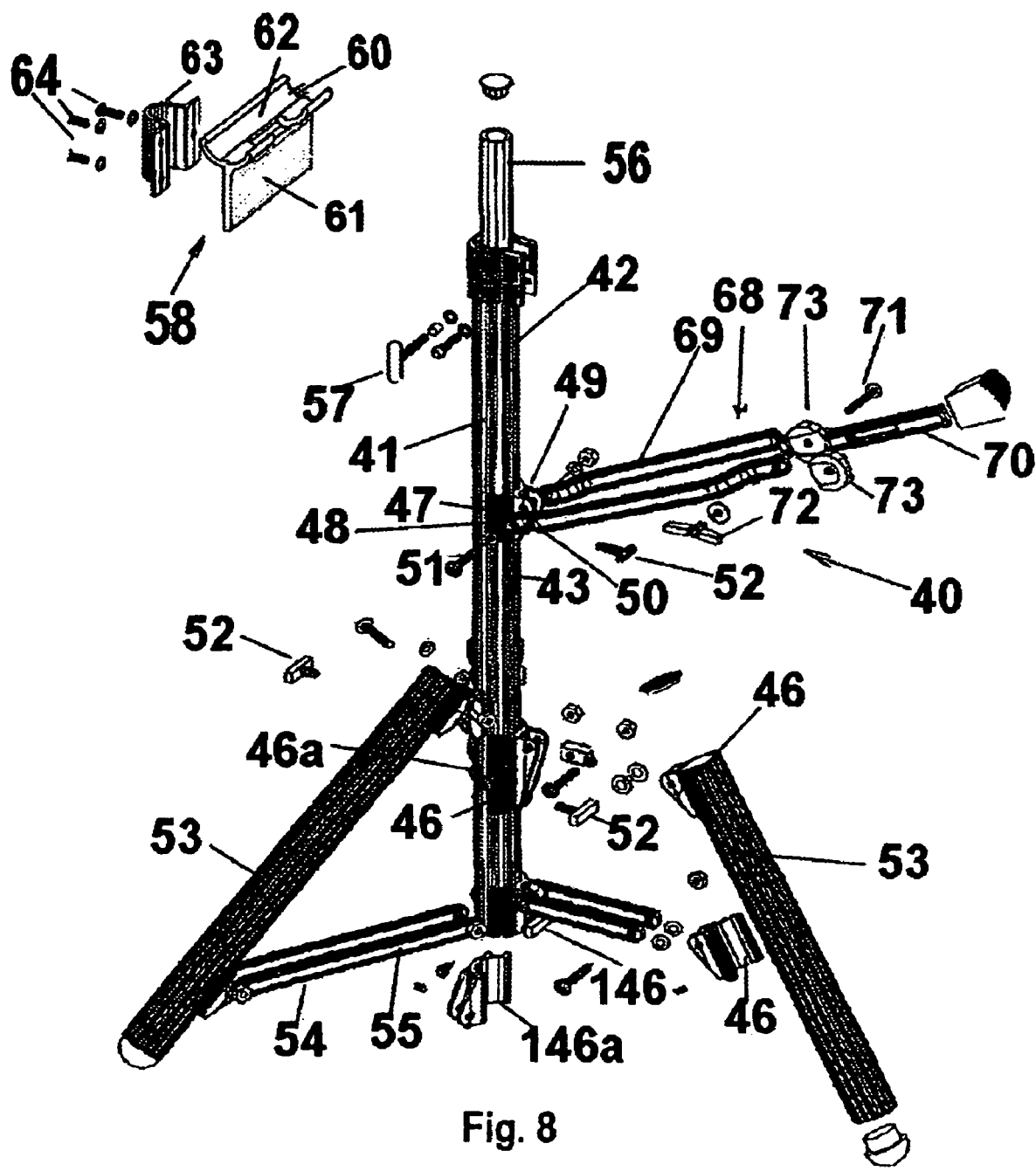
FIG. 8 is an exploded, isometric view of a tenor drum tripod stand.
Figure 12:
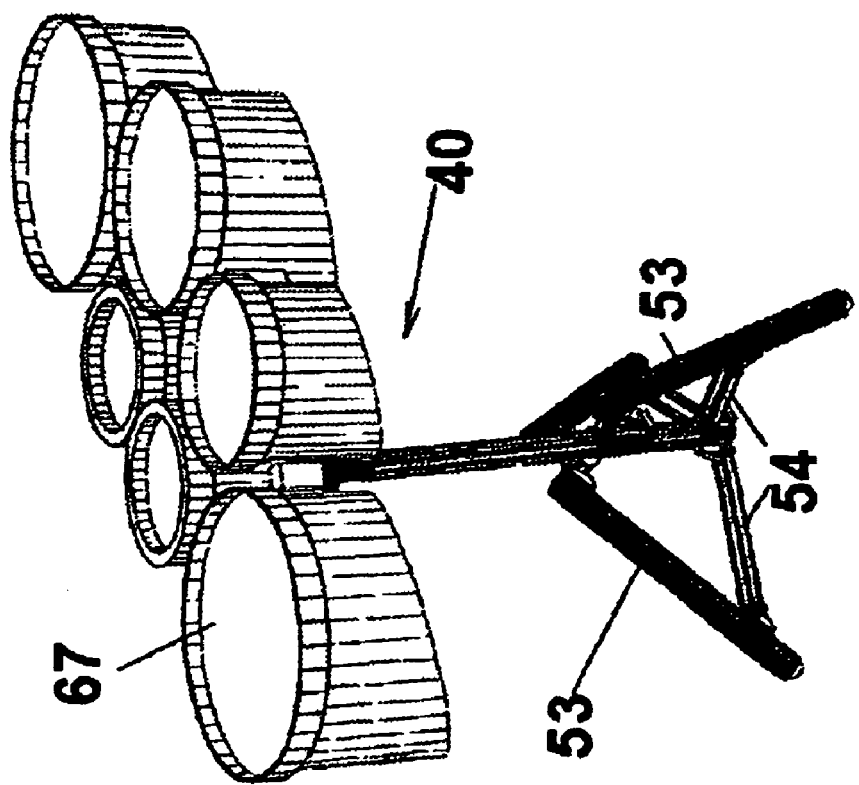
FIG. 12 is an isometric view of the tripod stand of FIG. 8 with tenor drums installed.
Figure 11:
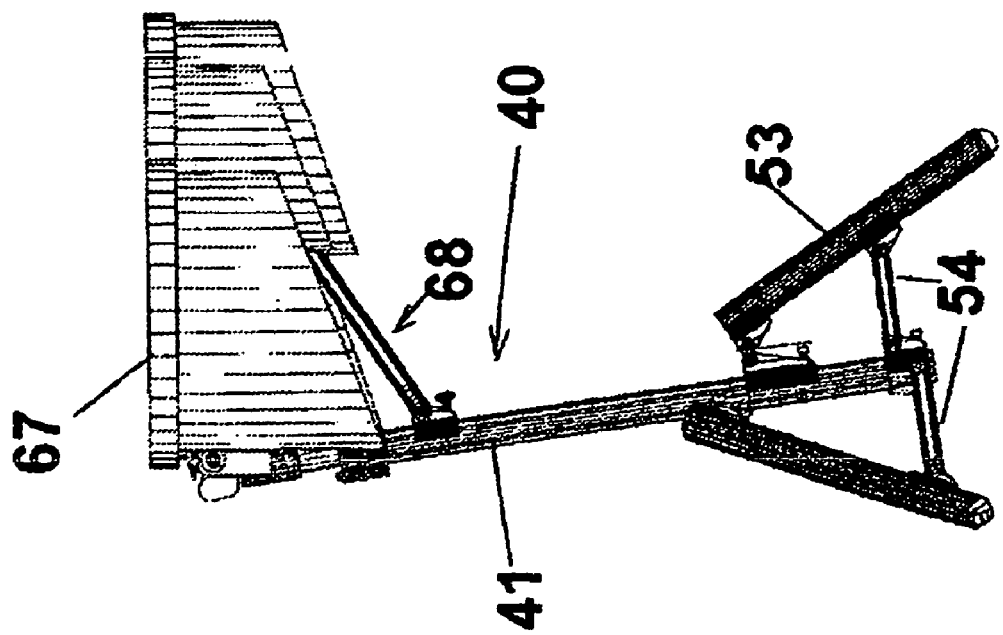
FIG. 11 is a view in side elevation of the tripod stand of FIG. 8 with tenor drums installed.
Figure 17:
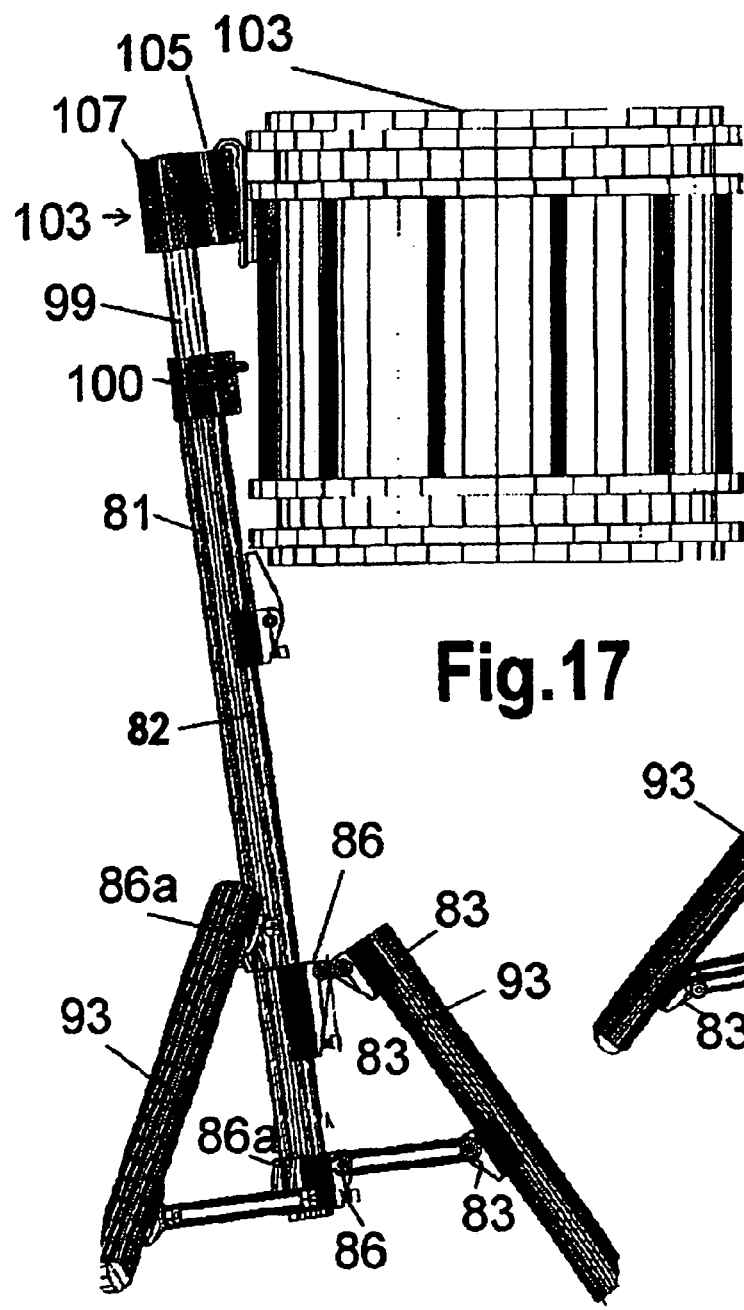
FIG. 17 is a view in side elevation of the stand of FIG. 13.
Figure 18:
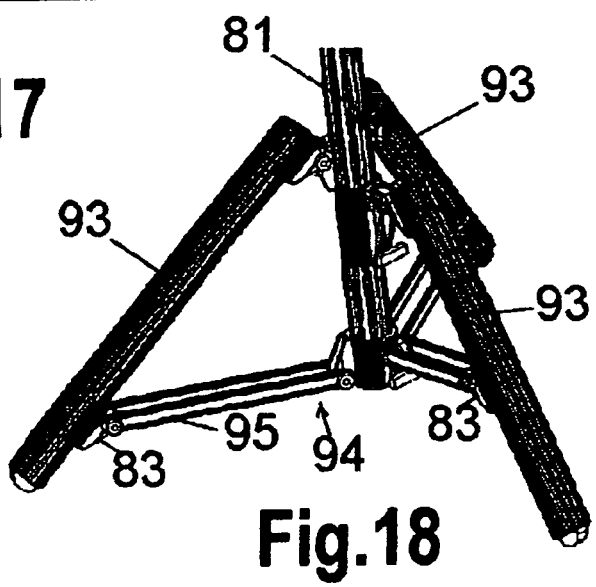
FIG. 18 is an isometric view of the base of the stand of FIG. 13.
Figure 19:
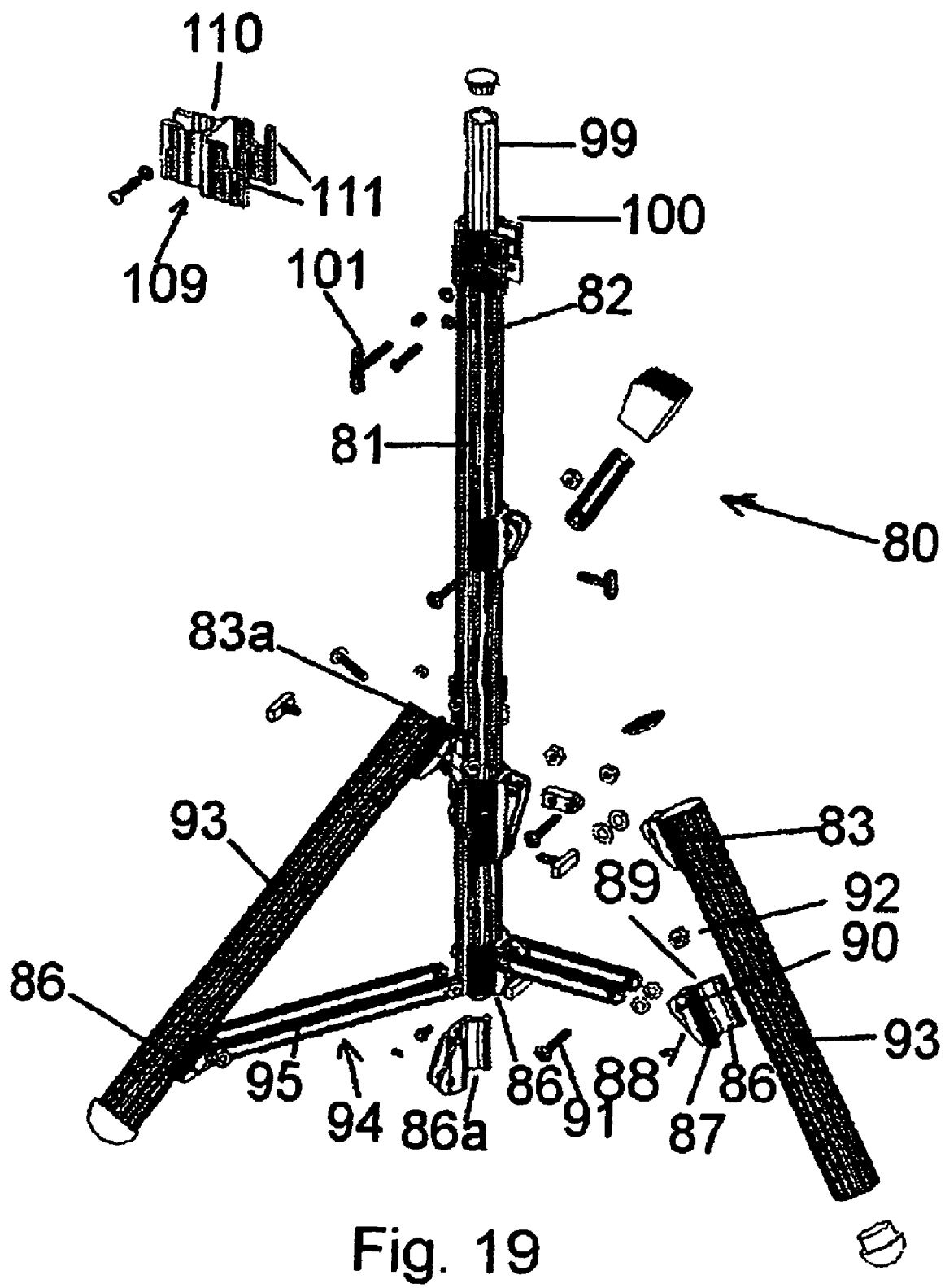
FIG. 19 is an exploded isometric view of the base of the stand of FIG. 13.

Referring now to FIGS. 8-12 of the drawings, there is shown an adjustable tripod stand for tenor drums. In FIG. 8, there is shown an exploded isometric view of an adjustable tripod stand 40 having a longitudinal upright center tube 41. Center tube 41 is fluted with a plurality of circumferentially spaced grooves 42 extending longitudinally of its exterior surface. There are four grooves 42, which are equally spaced and dovetail shaped in cross section.

Fluted tubes 41 are used for the upright support of the tripod, for the legs 53 and for drum supporting brace 68 (FIG. 8). A semi-circular (half tube) support collar member 43 (FIG. 8) for brace 68 is slidably mounted on center tube 41. Collar member 43 (FIG. 8) is semi-circular in cross section with the longitudinal edges 47 formed inwardly to fit in the dovetail longitudinal grooves 42 and has portion 48 with in-turned portions 47 and ears 49 with holes 50 for receiving a hinge bolt 51 for brace 68. Collar member 43 is independently movable relative to the others on tubular member 41. Wing screws 52 are provided on the collar member 43 and when-tightened, the collar member 43 is locked in a desired position on center tube 41.

Upper semi-circular (half tubes) upper leg support collar members 46 and 46a are slidably mounted on center tube 41 for supporting the upper ends of legs 53. Each of the collar members 46, 46a is semi-circular in cross section with the longitudinal edges 47 formed inwardly to fit in the dovetail longitudinal grooves 42. Collar member 46 (similar to 16 in FIG. 1B) has portion 48 with in-turned portions 47 and ears 49 with holes 50 for receiving a hinge bolt 51. A wing screw 52 locks collar member 46 in position.

The leg brace support collar members 146, 146a are substantially similar in construction and operation to the upper leg support collar members 16, 16a. Each collar member 146 is semi-circular (half tube) in cross section with the longitudinal edges bent inwardly to fit in the longitudinal grooves 12, similar in construction to collar members 13, 16.

Each collar member 46 has wing screws 22 for locking it in place in the same manner as collar members 43. Thus, each collar 46 is independently movable relative to the others on the center tube, and each may be locked in a desired position on the tube 41.

Each of the collar members 46a and 146a (FIG. 8) has a semi-circular (half tube) portion with longitudinal edges bent inwardly to fit in the longitudinal grooves 42. Collar member 146a has two sets of ears 19, spaced 120° apart with holes 50 for receiving a hinge bolt 51.

The upper end of each leg member 53 is pivotally mounted on center tube 41. Collar members 46 and 46a on center tube 41 are slidably mounted in grooves 42 and pivotally connected to collar members 46 on leg 53. Two of the leg members 53 are supported on collar member 146a, and one leg member 53 on collar 46 at the top of the center tube 41 to form the tripod. Each leg member 53 has a leg brace 54 comprising a pair of flat bars 55 pivotally connected at one end to collars 146 and 146a on center tube 41. The other ends of bars 55 are connected to collar 46 on leg member 53.

Each of leg members 53 has a leg extender member 27 slidably supported thereon as shown in FIG. 32. Leg extender member 27 has a semi-circular (half tube) collar portion 28 and a rigid leg portion 29. Collar portion 28 has longitudinal edges 30 formed inwardly to fit in the dovetail longitudinal grooves 12 for sliding movement to extend one of the leg members 53.

A wing screw 31 fits threaded aperture 32 in leg extender member 27 for locking in any selected position. The bottom end of each leg extender member 27 has a footpad 33 formed of resilient material. It should be understood that the bottom end of each leg member 27 may have a wheel or caster (not shown).

An elongate inner tubular member 56 is slidably received within the center tube 41 and anchored in position by a wing screw 57. The upper end of inner tubular member 56 has a bracket 58 for securing drum-supporting tube 59 in place. Bracket 58 comprises a supporting member 60 having a flat plate portion 61 and a half tube portion 62. Bracket 58 is mounted on the upper end of vertical tube 56 by bolts 64, which secure strap 63 on flat plate portion 61. Half tube portion 62 has one edge portion 65 to fit one of the dove tailed grooves 42 and a dove tailed rib 66 fitting into an adjacent groove.

Collar member 43 is slidably mounted on center tube 41 for supporting a brace assembly 68 for tenor drums. A pair of semi-circular leg brace support collar members 46 and 46a are slidably mounted on center tube 41. Each of the collar members 43, 46 is semi-circular in cross section with the longitudinal edges 47 formed inwardly to fit in the dovetail longitudinal grooves 42. Collar member 43 (similar to 13 in FIG. 1B) has portion 48 with in-turned portions 47 and ears 49 with holes 50 for receiving a hinge bolt 51. A wing screw 52 locks collar member 43 in position.

The leg brace support collar members 46 are substantially similar in construction and operation to the upper leg support collar member 43. Each collar member 46 is semi-circular (half tube) in cross section with the longitudinal edges 47 bent inwardly to fit in the longitudinal grooves 42, similar in construction to collar member 43. Each collar member 46 has wing screws 52 for locking it in place in the same manner as collar member 43. Thus, each collar 46 is independently movable relative to the others and the center tube 41, and each may be locked in a desired position on the tube 41.

The upper end of each leg member 53 is pivotally mounted on center tube 41. Collar member 46 is slidably mounted in grooves 42 and is pivotally connected to a collar member 46 on the center tube 11. Three of the leg members 53 are supported at the top of the center tube 41 to form the tripod. Each leg member 53 has a leg brace 54 comprising a pair of flat bars 55 pivotally connected at one end to collar 146, 146a on center tube 41. The other ends of bars 55 are connected to collar 46 on leg member 53.

Each of leg members 53 may have a leg extender member slidably supported thereon as in FIGS. 1 and 2. The leg extender member has a semi-circular (half tube) collar portion and a rigid leg portion. The collar portion has longitudinal edges formed inwardly to fit in the dovetail longitudinal grooves 42 for sliding movement to extend one of the leg members 53.

A wing screw fits a threaded aperture in the leg extender member for locking in any selected position. The bottom end of each leg extender member has a footpad formed of resilient material. It should be understood that the bottom end of each leg member may have a wheel or caster (not shown).

This tripod is designed for supporting one side of an array of tenor drums 67 on supporting tube 59. A supporting arm 68 for the other side of the array of drums 67 comprises a pair of elongate supporting plate members 69. The inner ends of plate members 69 are pivotally supported on ears 49 of collar member 43. The outer ends of plate members 69 are secured to the inner end of supporting rod 70 by bolt 71 and wing nut 72 on locating washers 73.

As seen in FIGS. 8-12, the collar segment 47 for supporting arm 68 and leg brace collar segments 46 can be moved from a position where the tripod legs are collapsed to a position where the bottom of the legs will extend radially an equal distance from the center of the tubular member 41.

This structure allows for placement of the stand in limited or confined areas. If the legs are supported on a level surface, adjustment will cause the longitudinal, vertical axis of the stand to be disposed in an off-vertical axis position for placing the center of gravity of the supported article relative to the center of the supporting legs. This adjustment also provides a minimum or maximum peripheral support base.

Center tube 41 is adjustable up or down (as in FIGS. 3 and 4) relative to collar members 47 and 46. Leg extenders are adjustable to permit the tripod assembly 10 to fit on different levels, when the tripod is used on the stairs or steps of a stadium or auditorium, As described above, the legs may also be extended radially inward and outward and may be extended in length by leg extenders. This allows for placement of the stand on an uneven or multi-level surface or platform and also in limited or confined areas. The legs may be adjusted relative to an uneven or multi-level surface to cause the vertical axis of the stand to be disposed in an off-vertical axis position for placing the center of gravity of the supported article relative to the center of the supporting legs even if they are at different heights.

Similarly, the top portion of the stand may have various conventional tripod mounting hardware for mounting a variety of articles and instruments such things as cameras, video equipment, telescopes, surveying instruments, and musical instruments. It should be understood that the particular tripod stand illustrated has a top portion configured to support musical drums, however other top portions may be provided for supporting such things as drums, cameras, video equipment, telescopes, surveying instruments, and the like.

Adjustable Tripod Stand for Snare Drums

Referring now to FIGS. 13-24 of the drawings, there is shown an adjustable tripod stand 80 for snare drums. In FIG. 13 (more detailed in FIG. 19), there is shown an isometric view of an adjustable tripod stand 80 having a longitudinal upright center tube 81 that is fluted with a plurality of circumferentially spaced grooves 82 extending longitudinally of its exterior surface. There are four grooves 82, which are equally spaced and dovetail There are four grooves 82, which are equally spaced and dovetail shaped in cross section, substantially the structure of tube 11 and grooves 12 in FIG. 1A.

A semi-circular (half tube) upper leg support collar member 83 for one of the legs 93 and a collar member 83a for two of the legs 93 are slidably mounted on center tube 81. A semi-circular leg brace support collar members 86 for one of the legs 93 and a collar member 86a for two of the legs 93 are slidably mounted on center tube 81.

Each of the collar members 83, 86 is semi-circular in cross section with the longitudinal edges 87 formed inwardly to fit in the dovetail longitudinal grooves 82. Collar member 83, 86 (similar to collar 13 in FIG. 1B) has portion 88 with in-turned portions 87 and ears 89 with holes 90 for receiving a hinge bolt 91. A wing screw 92 locks collar member 83 in position.

The leg brace support collar members 86 and 86a are each semi-circular (half tube) in cross section with the longitudinal edges 87 bent inwardly to fit in the longitudinal grooves 82, similar in construction to collar member 83. Each collar member 86 has wing screws 92 for locking it in place in the same manner as collar member 83. Thus, each collar 86 is independently movable relative to the others and the center tube 81, and each may be locked in a desired position on the tube 81.

The upper end of each leg member 93 is pivotally mounted on center tube 81 by collars 83. Collar member 83 is slidably mounted in grooves 82 and is pivotally connected to a collar member on the center tube 81. One of the leg members 93 is supported on collar member 83 the center tube 81 and two of the leg members 93 are supported on collar member 86a to form the tripod.

Each leg member 93 has a leg brace 94 comprising one pair of flat bars 95 pivotally connected at one end to collar 86 and two pairs of flat bars 95 connected at one end to collar 86a on center tube 81. The other ends of bars 95 are connected to collars 86 on leg member 93.

Figure 23:
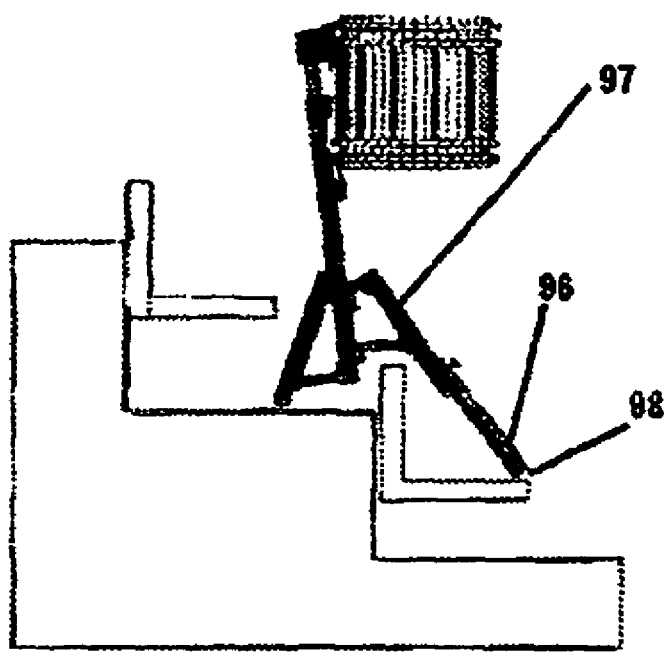
FIG. 23 is a view in side elevation, and FIG. 24 an isometric view showing the tripod and snare drums installed on the steps or stairs of a stadium or auditorium.
Figure 24:
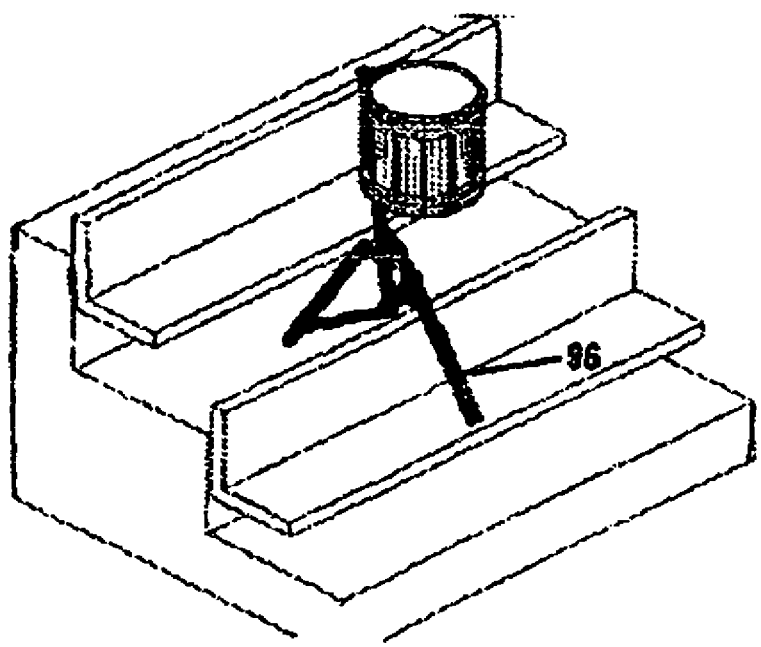
Figure 34:
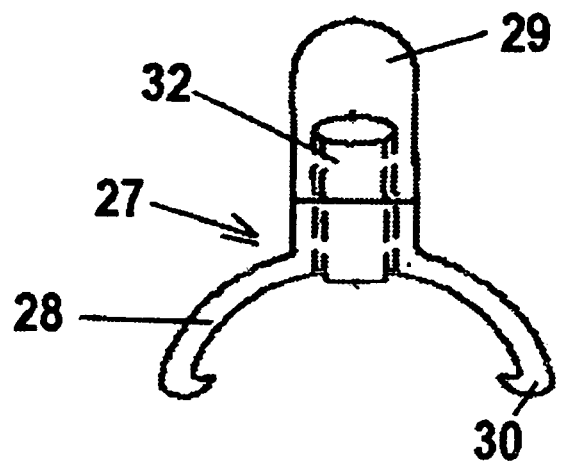
FIG. 34 is an end view of the leg extender shown in FIG. 32.
Figure 33:
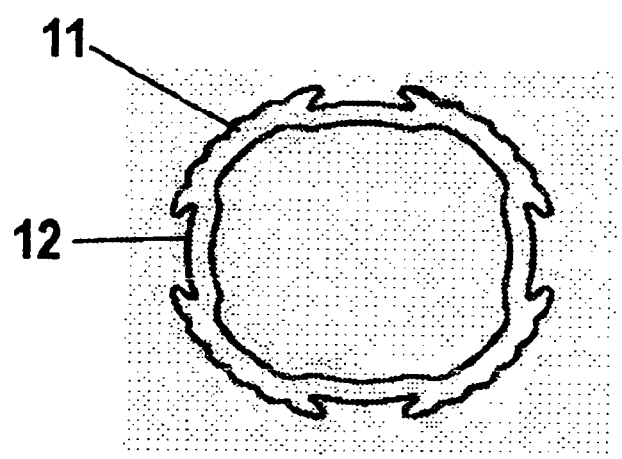
FIG. 33 is an end view of the tripod leg on which the extender is supported.

Each of leg members 93 may have a leg extender member 96 slidably supported thereon as in FIGS. 23 and 24 (construction being the same as in FIGS. 32-34). The leg extender member 96 has a semi-circular (half tube) collar portion and a rigid leg portion. The collar portion has longitudinal edges formed inwardly to fit in the dovetail longitudinal grooves 82 for sliding movement to extend one of the leg members 93.

A wing screw 97 fits a threaded aperture in the leg extender member 96 for locking in any selected position. The bottom end of each leg extender member has a footpad 98 formed of resilient material. It should be understood that the bottom end of each leg member may have a wheel or caster (not shown).

An elongate inner tubular member 99 is slidably received within the center tube 81 and anchored in position by a collar 100. The upper end of inner tubular member 99 has a bracket 102 for supporting drum 103 in place. Bracket 102 comprises a curved base portion 104 with walls 105 extending forward and in-turned portions 106. Clamping walls 107 extend from the back of wall 104 for mounting on the upper end of vertical tube 99 and clamped in place by bolt 108. Drum 103 has a hook-shaped bracket fitting over in-turned wall portions 106 (FIG. 15).

FIGS. 19-22, show a tripod for snare drums, which is the same as that shown in FIGS. 13-16, except that a different drum-supporting bracket is used. All of the lower part of the tripod assembly 80 is the same and has the same reference numerals. The drum-supporting bracket 109 (FIG. 10) has clamping walls 110 extending from the backside to be clamped on tube 99. Slotted walls 111 extend from the front of bracket 109. Drum 112 has a supporting bracket consisting of strap 113 and bolt 114, which pit into and are supported by the slotted walls 111 or bracket 109.

Adjustable Tripod Stand for Bass Drums

FIGS. 25 and 26 show an adjustable tripod stand for bass drums. The structure of the tripod stand 80 is the same as in FIGS. 13-24. Like reference numbers are used. The difference in structure is in the bass drum support 120 at the top of the stand.

Bass drum support 120 comprises upper and lower collars 121, each having four pairs of ears 122 spaced equally around the periphery of the collar. Four drum-supporting legs 123 are supported in the upper collar 121 and have cushioning caps 124 at their outer ends. Leg braces 125 are secured at their lower ends on lower collar 121 and at their upper ends are connected one to each of said drum-supporting legs 123. Movement of the upper and lower collars toward and away from each other will collapse or open drum support 120. Bass drum 126 is supported on the cradle formed by the upper ends of supporting legs 123.

Each of leg members 93 may have a leg extender member 96 slidably supported thereon as in FIGS. 23 and 24 (construction being the same as in FIGS. 32-34). The leg extender member 96 has a semi-circular (half tube) collar portion and a rigid leg portion. The collar portion has longitudinal edges formed inwardly to fit in the dovetail longitudinal grooves 82 for sliding movement to extend one of the leg members 93.

A wing screw 97 fits a threaded aperture in the leg extender member 96 for locking in any selected position. The bottom end of each leg extender member has a footpad 98 formed of resilient material. It should be understood that the bottom end of each leg member may have a wheel or caster (not shown).

Adjustable Tripod Stand for Conga Drums

FIGS. 27-31 show an adjustable tripod stand 130 for conga drums or the like. Stand 130 comprises three upright leg tubes 131, each being fluted with a plurality of circumferentially spaced grooves 132 extending longitudinally of its exterior surface, which are equally spaced and dovetail shaped in cross section, substantially the structure of tube 11 and grooves 12 in FIG. 1A.

Upper and lower semi-circular (half tube) collar members 133 for each of the legs 131 are slidably mounted on the leg tubes. Leg brace members 134 supported at one end on collar members 133 and are connected at their other ends to triangular support members 135. Vertical brace members 136 are pivotally supported on each of leg brace members 134 and fixed in operating position by thumbscrews 137.

Each of leg members 131 has an upper leg extender member 138 slidably supported thereon (as in FIGS. 1 and 2). The leg extender member 138 has a semi-circular (half tube) collar portion and a rigid leg portion. The collar portion has longitudinal edges formed inwardly to fit in the dovetail longitudinal grooves 132 for sliding movement to extend the leg extender members 138 upward as in FIG. 31. Curved supporting plates 139 on the upper ends of leg extenders 138 support different sizes of conga drums 140 and 141. Thumbscrews 143 fix the leg extenders 138 in any selected position.

Each of leg members 131 has a lower leg extender member 142 slidably supported thereon (as in FIGS. 1 and 2). The leg extender member 142 has a semi-circular (half tube) collar portion and a rigid leg portion. The collar portion has longitudinal edges formed inwardly to fit in the dovetail longitudinal grooves 132 for sliding movement to extend the leg extender members 142 downward. Thumbscrews 144 fix the leg extenders 142 in any selected position. The extension of a single one for the leg extenders 142 allows the tripod to be supported on stairs or steps, as in an auditorium or stadium, or adjust height and angle.

This tripod differs from the others in that the legs do not collapse toward a central, vertical supporting tube. The tripod has the folded back initial position shown in FIG. 27 when not in use. Then, two of the legs are rotated outward as shown in FIG. 28 and locked in position by braces 136. The adjustability of the stand is by the leg extenders 142 at the bottom and the upper extenders 138 which can be adjusted for different sizes and shapes of conga drums.

While this invention has been described fully and completely with special emphasis upon a preferred embodiment, it should be understood that within the scope of the appended claims the invention may be practiced otherwise than as specifically described herein.

I claim:

1. An adjustable tripod stand having independently adjustable legs comprising:
    three supporting legs,
    at least one leg extender member slidably mounted on at least one of said three supporting legs operable to extend the length of said leg,
    independent, upper and lower, vertically-spaced, and vertically adjustable, centrally-positioned support members,
    three upper and three lower leg brace members each supported horizontally at one end on the three supporting legs and at the other end horizontally in a planar arrangement on the independent upper and lower vertically-spaced centrally-positioned support members respectively such that at least two of said upper and lower leg brace members pivot horizontally on said centrally-positioned support members,
    and at least one leg stabilizing brace member that is supported at one end on said upper leg brace member and at the other end on an adjacent said lower leg brace member to stabilize said tripod stand when, opened to function to resist twisting and rotation of said tripod.

2. The adjustable tripod stand according to claim 1 in which said leg extender member is slidably mounted on the outside of each of said three supporting legs and is extendable to provide a support for said tripod stand on different levels, heights or angles.

3. The adjustable tripod stand according to claim 2 in which said legs with leg extender members being pivotally movable about a vertical axis on said vertically-spaced, centrally-positioned support members, between a collapsed and an open position.

4. The adjustable tripod stand according to claim 3 in which said upper and lower, vertically-spaced, centrally-positioned support members each comprises a pair of support plates, and
    said brace members are supported at one end between a pair of said support plates for pivotal movement about a vertical axis thereon.

5. The adjustable tripod stand according to claim 1 wherein the at least one leg stabilizing brace member is pivotally supported at one end on a lower leg brace member and at the other end on an adjacent upper leg brace member.

6. The adjustable tripod stand according to claim 1 that further includes at least one lower leg extender that engages on the outside of said three supporting legs and is movable longotudinally along and beyond the end of said supporting leg and said at least one upper leg extender further includes a pivotably secured support plate having a curved shape to engage and support a conga drum there between.

7. The adjustable tripod stand according to claim 1 in which one leg is fixed in orientation to the centrally positioned support members and the two remaining legs swing around the center of the tripod stand in an arrangement leaving the three legs adjacent to each other and distal from the centrally-positioned support members.

8. The adjustable tripod stand according to claim 1 in which the at least one leg stabilizing brace member connects adjacent legs in a diagonal relationship.

9. The adjustable tripod stand from claim 1 wherein the said upper and lower, vertically-spaced, centrally-positioned support members are adjustable and or slidably engagable on the three supporting legs.

10. The adjustable tripod stand according to claim 1 in which said adjustable tripod stand is connected in a tripod configuration with semi-circular collar members where the connection between the three supporting legs is on the interior facing surface of the three legs with parallel inward turned elongated dovetail edge connection having an angle of wrap on each leg of less than 180 degrees.

11. The adjustable tripod stand according to claim 1 wherein said at least one leg extending member slidably mounted on said at least one of said three supporting legs extends said at least one leg extending member above at least one of said three supporting legs.

12. The adjustable tripod stand according to claim 1 wherein said at least one leg extending member slidably mounted on said at least one of said three supporting legs extends said at least one leg extending member below at least one of said three supporting legs.

13. The adjustable tripod stand according to claim 1 wherein said leg extender engages on said supporting leg with inward turned dovetail edges that engage in elongated recess of said supporting legs.

14. The adjustable tripod stand according to claim 13 wherein said leg inward turned dovetail edges that engage onto said supporting leg with a wrap angle of less than 180 degrees.

15. The adjustable tripod stand according to claim 1 wherein said three upper and three lower leg brace members engages on said supporting leg with inward turned dovetail edges that engage in elongated recess of said supporting legs.

16. The adjustable tripod stand according to claim 15 wherein said leg inward turned dovetail edges that engage onto said supporting leg with a wrap angle of less than 180 degrees.

17. The adjustable tripod stand according to claim 1 wherein said at least one leg extender and said three upper and three lower leg brace members slide on the legs in a bypass configuration.

18. The adjustable tripod stand according to claim 1 wherein said at least one leg extenders have curved plate on their unsupported end.

19. The adjustable tripod stand according to claim 18 wherein at least three leg extenders members located on said three supporting legs defining a base for supporting a drum on said curved plates.

20. The adjustable tripod stand according to claim 1 wherein said leg stabilizing braces are slotted on at least one end for engagement onto said leg brace.

* * * * *